United States Patent
Ahmed et al.

(10) Patent No.: US 10,674,350 B2
(45) Date of Patent: Jun. 2, 2020

(54) NETWORK SUBSCRIPTION HANDLING

(71) Applicant: Telefonaktiebolaget LM Ericsson (publ), Stockholm (SE)

(72) Inventors: Abu Shohel Ahmed, Espoo (FI); Patrik Salmela, Espoo (FI); Kazi Wali Ullah, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 12 days.

(21) Appl. No.: 16/327,038

(22) PCT Filed: Aug. 24, 2016

(86) PCT No.: PCT/EP2016/070013
§ 371 (c)(1),
(2) Date: Feb. 21, 2019

(87) PCT Pub. No.: WO2018/036624
PCT Pub. Date: Mar. 1, 2018

(65) Prior Publication Data
US 2019/0182659 A1    Jun. 13, 2019

(51) Int. Cl.
*H04W 4/00* (2018.01)
*H04W 8/20* (2009.01)
(Continued)

(52) U.S. Cl.
CPC .......... *H04W 8/205* (2013.01); *H04L 63/102* (2013.01); *H04W 8/245* (2013.01); *H04W 8/265* (2013.01); *H04W 12/04* (2013.01); *H04W 12/12* (2013.01)

(58) Field of Classification Search
CPC ..... H04W 8/205; H04W 8/245; H04W 8/265; H04W 12/04; H04L 63/12
(Continued)

(56) References Cited

U.S. PATENT DOCUMENTS

| | | | |
|---|---|---|---|
| 2009/0217348 A1* | 8/2009 | Salmela | H04W 4/70 726/2 |
| 2016/0057725 A1 | 2/2016 | Suh | |
| 2016/0149903 A1 | 5/2016 | Suh | |

FOREIGN PATENT DOCUMENTS

EP    2 854 432 A2    4/2015

OTHER PUBLICATIONS

GSM Association, Official Document SGP.22-RSP Technical Specification, Version 1.0, Jan. 13, 2016, 114 pgs.
(Continued)

*Primary Examiner* — Huy C Ho
(74) *Attorney, Agent, or Firm* — Rothwell, Figg, Ernst & Manbeck, P.C.

(57) ABSTRACT

There is provided mechanisms for handling network subscriptions of a subscriber entity having a network subscription locked to a source subscription management entity. A method is performed by a profile handling entity. The method comprises obtaining a request message for download of a new network subscription handled by a target subscription management entity, the request message comprising identity information of the target subscription management entity. The method comprises transmitting, when there is a mismatch between the identity information and reference identity information, a release request message of the network subscription to the source subscription management entity via the target subscription management entity. The method comprises receiving, from the source subscription management entity via the target subscription management entity, a release response message of the network subscription. The method comprises allowing the target subscription management entity to download the new network subscription to the subscriber entity upon successful verification of the release response message.

21 Claims, 7 Drawing Sheets

(51) Int. Cl.
     *H04L 29/06*        (2006.01)
     *H04W 8/24*         (2009.01)
     *H04W 8/26*         (2009.01)
     *H04W 12/04*       (2009.01)
     *H04W 12/12*       (2009.01)

(58) Field of Classification Search
     USPC .................................................. 455/435.1
     See application file for complete search history.

(56) References Cited

OTHER PUBLICATIONS

International Search Report and Written Opinion issued in International Application No. PCT/EP2016/070013, dated Apr. 24, 2017, 14 pages.

\* cited by examiner

NETWORK SUBSCRIPTION HANDLING

CROSS REFERENCE TO RELATED APPLICATION(S)

This application is a 35 U.S.C. § 371 National Stage of International Patent Application No. PCT/EP2016/070013, filed Aug. 24, 2016, designating the United States, the disclosure of which is incorporated by reference.

TECHNICAL FIELD

Embodiments presented herein relate to a method, a profile handling entity, a source subscription management entity, a target subscription management entity, computer programs, and a computer program product for handling network subscriptions of a subscriber entity having a network subscription locked to the source subscription management entity.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module, or subscriber identification module, (SIM) is an integrated circuit chip that is intended to securely store the international mobile subscriber identity (IMSI) number and its related encryption key, as well as other information relevant for the subscription, which is used to identify and authenticate subscriptions on the devices. The functionality of the SIM circuit could be part of the functionality of a Universal Integrated Circuit Card (UICC) physical smart card. Traditional SIM cards are predicated on only associating with one network operator.

The GSM Association (GSMA), where GSM is short for Global System for Mobile communications, has released a technical specification denoted SGP.22—RSP defining remote SIM provisioning for consumer devices and a technical specification denoted SGP.02 disclosing a remote provisioning architecture for Embedded UICC (eUICC), which targets machine-to-machine (M2M) type communications devices. In short, the operator uses an entity called SM-DP+/SM-DP (short for Subscription Management—Data Preparation) for creation of SIM profiles that are later installed from the SM-DP/SM-DP+ to the eUICC. For the consumer devices, the profile is installed through a Local Profile Assistant (LPA) on the consumer device to the Issuer Security Domain Profile (ISD-P) on the eUICC in the device. For the M2M devices, the SM-DP installs the profile via a separate (external) entity, SM-SR, to the ISD-P on the device.

Both above mentioned variants have the device owner obtaining a subscription for the device from the operator by providing the operator with relevant information about the device to be provisioned, optionally including eUICC ID (EID) and International Mobile Station Equipment Identity (IMEI). The subscription can be obtained from a point of sales, via a web page of the operator, or other similar methods. Section 3.B in SGP.22 describes the profile download initiation process. It shows how the user orders a subscription from the operator, and how the operator asks the SM-DP+ to generate the matching profile. Then the operator provides the user with an activation code (AC) that the user can insert into/provide to the device to be provisioned. The device can extract the relevant information (SM-DP+ reachability information, etc.) from the activation code and then proceed to contact the SM-DP+ for downloading the profile based on the AC after mutual authentication and various security functions.

The above referred technical specification documents suggest that the device to be provisioned (denoted companion device) can be managed through a primary device (e.g., a User Equipment), which can e.g. provide global connectivity (through e.g. WiFi tethering) to the device to be provisioned and act as the input device for entering e.g. the activation code of the device to be provisioned. The technical specification SGP.22 also defines a GetEID function that can be used for retrieving the EID of the device to be provisioned.

In some countries, mobile network operators (MNOs) sell subscriptions with subsidy; MNOs sell subsidized subscriber devices to earn money from subscriptions. This requires the MNOs to lock the subscriber devices with a specific MNO. Existing mechanisms for locking subscriber devices with a specific MNO include firmware lock by the device manufacturer to lock the subscriber device to a particular network. Users of the subscriber device could then need to enter a specific sequence of digits (code) to unlock the subscriber device. However, it could be desirable to control switching of network operator profiles in order to enable the subscriber device to migrate from one MNO to another MNO during the life cycle of the subscriber device.

Hence, there is still a need for an improved handling of network subscriptions of a subscriber device.

SUMMARY

An object of embodiments herein is to provide efficient mechanisms for handling of network subscriptions of a subscriber device.

According to a first aspect there is presented a method for handling network subscriptions of a subscriber entity having a network subscription locked to a source subscription management entity. The method is performed by a profile handling entity. The method comprises obtaining a request message for download of a new network subscription handled by a target subscription management entity, the request message comprising identity information of the target subscription management entity. The method comprises transmitting, when there is a mismatch between the identity information and reference identity information, a release request message of the network subscription to the source subscription management entity via the target subscription management entity. The method comprises receiving, from the source subscription management entity via the target subscription management entity, a release response message of the network subscription. The method comprises allowing the target subscription management entity to download the new network subscription to the subscriber entity upon successful verification of the release response message.

According to a second aspect there is presented a profile handling entity for handling network subscriptions of a subscriber entity having a network subscription locked to a source subscription management entity. The profile handling entity comprises processing circuitry. The processing circuitry is configured to cause the profile handling entity to obtain a request message for download of a new network subscription handled by a target subscription management entity, the request message comprising identity information of the target subscription management entity. The processing circuitry is configured to cause the profile handling entity to transmit, when there is a mismatch between the identity information and reference identity information, a release request message of the network subscription to the source subscription management entity via the target subscription management entity. The processing circuitry is configured to cause the profile handling entity to receive, from the source subscription management entity via the target subscription management entity, a release response message of the network subscription. The processing circuitry is configured to cause the profile handling entity to allow the target subscription management entity to download the new network subscription to the subscriber entity upon successful verification of the release response message.

According to a third aspect there is presented a profile handling entity for handling network subscriptions of a subscriber entity having a network subscription locked to a source subscription management entity. The profile handling entity comprises processing circuitry and a computer program product. The computer program product stores instructions that, when executed by the processing circuitry, causes the profile handling entity to perform operations, or steps. The operations, or steps, cause the profile handling entity to obtain a request message for download of a new network subscription handled by a target subscription management entity, the request message comprising identity information of the target subscription management entity. The operations, or steps, cause the profile handling entity to transmit, when there is a mismatch between the identity information and reference identity information, a release request message of the network subscription to the source subscription management entity via the target subscription management entity. The operations, or steps, cause the profile handling entity to receive, from the source subscription management entity via the target subscription management entity, a release response message of the network subscription. The operations, or steps, cause the profile handling entity to allow the target subscription management entity to download the new network subscription to the subscriber entity upon successful verification of the release response message.

According to a fourth aspect there is presented a profile handling entity for handling network subscriptions of a subscriber entity having a network subscription locked to a source subscription management entity. The profile handling entity comprises an obtain module configured to obtain a request message for download of a new network subscription handled by a target subscription management entity, the request message comprising identity information of the target subscription management entity. The profile handling entity comprises a transmit module configured to transmit, when there is a mismatch between the identity information and reference identity information, a release request message of the network subscription to the source subscription management entity via the target subscription management entity. The profile handling entity comprises a receive module configured to receive, from the source subscription management entity via the target subscription management entity, a release response message of the network subscription. The profile handling entity comprises an allow module configured to allow the target subscription management entity to download the new network subscription to the subscriber entity upon successful verification of the release response message.

According to a fifth aspect there is presented a computer program for handling network subscriptions of a subscriber entity having a network subscription locked to a source subscription management entity, the computer program comprising computer program code which, when run on processing circuitry of a profile handling entity, causes the profile handling entity to perform a method according to the first aspect.

According to a sixth aspect there is presented a method for handling network 3o subscriptions of a subscriber entity having a network subscription locked to a source subscription management entity. The method is performed by the source subscription management entity. The method comprises receiving, from a profile handling entity and via a target subscription management entity, a release request message of the network subscription. The method comprises transmitting a release response message of the network subscription to the profile handling entity via the target subscription management entity, thereby enabling the profile handling entity to download a new network subscription from the target subscription management entity to the subscriber entity upon successful verification of the release response message.

According to a seventh aspect there is presented a source subscription management entity for handling network subscriptions of a subscriber entity having a network subscription locked to the source subscription management entity. The source subscription management entity comprises processing circuitry. The processing circuitry is configured to cause the source subscription management entity to receive, from a profile handling entity and via a target subscription management entity, a release request message of the network subscription. The processing circuitry is configured to cause the source subscription management entity to transmit a release response message of the network subscription to the profile handling entity via the target subscription management entity, thereby enabling the profile handling entity to download a new network subscription from the target subscription management entity to the subscriber entity upon successful verification of the release response message.

According to an eighth aspect there is presented a source subscription management entity for handling network subscriptions of a subscriber entity having a network subscription locked to the source subscription management entity. The source subscription management entity comprises processing circuitry and a computer program product. The computer program product stores instructions that, when executed by the processing circuitry, causes the profile handling entity to perform operations, or steps. The operations, or steps, cause the source subscription management entity to receive, from a profile handling entity and via a target subscription management entity, a release request message of the network subscription. The operations, or steps, cause the source subscription management entity to transmit a release response message of the network subscription to the profile handling entity via the target subscription management entity, thereby enabling the profile handling entity to download a new network subscription from the target subscription management entity to the subscriber entity upon successful verification of the release response message.

According to a ninth aspect there is presented a source subscription management entity for handling network subscriptions of a subscriber entity having a network subscription locked to the source subscription management entity. The source subscription management entity comprises a receive module configured to receive, from a profile handling entity and via a target subscription management entity, a release request message of the network subscription. The source subscription management entity comprises a transmit module configured to transmit a release response message of the network subscription to the profile handling entity via the target subscription management entity, thereby enabling the profile handling entity to download a new network subscription from the target subscription management entity to the subscriber entity upon successful verification of the release response message.

According to a tenth aspect there is presented a computer program for handling network subscriptions of a subscriber entity having a network subscription locked to a source subscription management entity, the computer program comprising computer program code which, when run on processing circuitry of the source subscription management entity, causes the source subscription management entity to perform a method according to the sixth aspect.

According to an eleventh aspect there is presented a method for handling network subscriptions of a subscriber entity having a network subscription locked to a source subscription management entity. The method is performed by a target subscription management entity. The method comprises receiving, from a profile handling entity, a release request message of the network subscription. The method comprises forwarding the release request message to the source subscription management entity. The method comprises receiving a release response message of the network subscription from the source subscription management entity. The method comprises forwarding the release response message to the profile handling entity, thereby enabling the profile handling entity to download a new network subscription from the target subscription management entity to the subscriber entity upon successful verification of the release response message.

According to a twelfth aspect there is presented a target subscription management entity for handling network subscriptions of a subscriber entity having a network subscription locked to a source subscription management entity. The target subscription management entity comprises processing circuitry. The processing circuitry is configured to cause the target subscription management entity to receive, from a profile handling entity, a release request message of the network subscription. The processing circuitry is configured to cause the target subscription management entity to forward the release request message to the source subscription management entity. The processing circuitry is configured to cause the target subscription management entity to receive a release response message of the network subscription from the source subscription management entity. The processing circuitry is configured to cause the target subscription management entity to forward the release response message to the profile handling entity, thereby enabling the profile handling entity to download a new network subscription from the target subscription management entity to the subscriber entity upon successful verification of the release response message.

According to a thirteenth aspect there is presented a target subscription management entity for handling network subscriptions of a subscriber entity having a network subscription locked to a source subscription management entity. The target subscription management entity comprises processing circuitry and a computer program product. The computer program product stores instructions that, when executed by the processing circuitry, causes the profile handling entity to perform operations, or steps. The operations, or steps, cause the target subscription management entity to receive, from a profile handling entity, a release request message of the network subscription. The operations, or steps, cause the target subscription management entity to forward the release request message to the source subscription management entity. The operations, or steps, cause the target subscription management entity to receive a release response message of the network subscription from the source subscription management entity. The operations, or steps, cause the target subscription management entity to forward the release response message to the profile handling entity, thereby enabling the profile handling entity to download a new network subscription from the target subscription management entity to the subscriber entity upon successful verification of the release response message.

According to a fourteenth aspect there is presented a target subscription management entity for handling network subscriptions of a subscriber entity having a network subscription locked to a source subscription management entity. The target subscription management entity comprises a receive module configured to receive, from a profile handling entity, a release request message of the network subscription. The target subscription management entity comprises a forward module configured to forward the release request message to the source subscription management entity. The target subscription management entity comprises a receive module configured to receive a release response message of the network subscription from the source subscription management entity. The target subscription management entity comprises a forward module configured to forward the release response message to the profile handling entity, thereby enabling the profile handling entity to download a new network subscription from the target subscription management entity to the subscriber entity upon successful verification of the release response message.

According to a fifteenth aspect there is presented a computer program for handling network subscriptions of a subscriber entity having a network subscription locked to a source subscription management entity, the computer program comprising computer program code which, when run on processing circuitry of a target subscription management entity, causes the target subscription management entity to the eleventh aspect.

According to a sixteenth aspect there is presented a computer program product comprising a computer program according to at least one of the fifth aspect, the tenth aspect, and the fifteenth aspect and a computer readable storage medium on which the computer program is stored. The computer readable storage medium can be a non-transitory computer readable storage medium.

Advantageously these methods, these profile handling entities, these source subscription management entities, these target subscription management entities, and these computer programs enable efficient handling of network subscriptions of a subscriber device.

Advantageously these methods, these profile handling entities, these source subscription management entities, these target subscription management entities, and these computer programs enable selective control of download of network subscriptions to an eUICC.

Advantageously these methods, these profile handling entities, these source subscription management entities, these target subscription management entities, and these computer programs enable enforcement of contractual agreements between MNOs and subscriber entities in relation to changing network subscriptions.

Advantageously these methods, these profile handling entities, these source subscription management entities, these target subscription management entities, and these computer programs enable life cycle management of eUICC ownership.

It is to be noted that any feature of the first, second, third, fourth, fifth, sixth seventh, eight, ninth, tenth, eleventh, twelfth, thirteen, fourteenth, fifteenth and sixteenth aspects may be applied to any other aspect, wherever appropriate. Likewise, any advantage of the first aspect may equally apply to the second, third, fourth, fifth, sixth, seventh, eight, ninth, tenth, eleventh twelfth, thirteen, fourteenth, fifteenth, and sixteenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
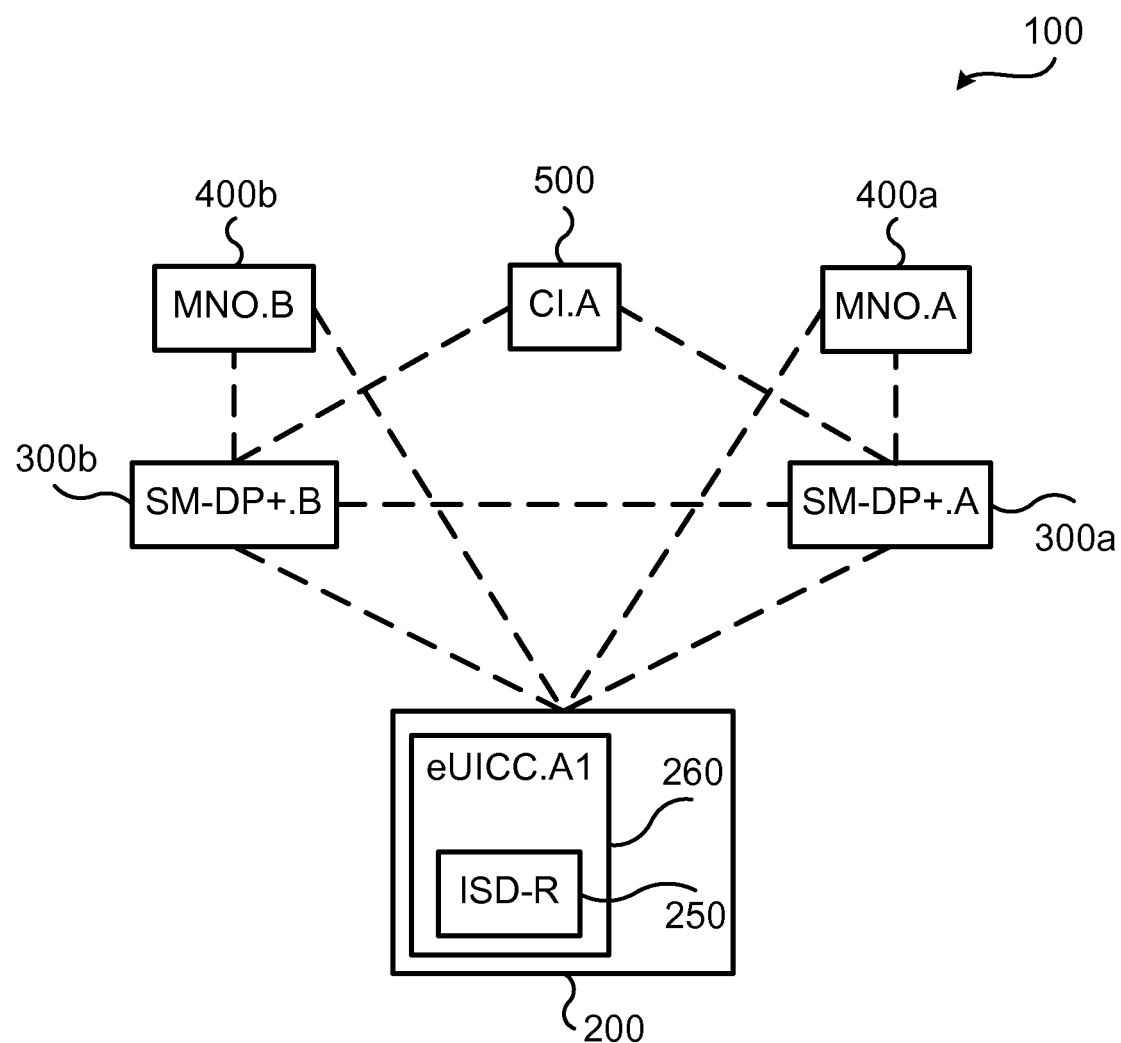
FIG. 1 is a schematic diagram illustrating a communications system according to embodiments.

FIG. 1 is a schematic simplified diagram of a communications system 100 where embodiments presented herein can be applied. The communications system 100 comprises a subscriber entity 200. The subscriber entity 200 comprises a profile handling unit 250, 260, which could be provided as an Issuer Security Domain Root (ISD-R) function 250, or just ISD-R for short, and an Embedded Universal Integrated Circuit Card (eUICC) 260. According to some aspects the ISD-R 250 is provided within the eUICC 260.

The communications system 100 further comprises at least two subscription management entities 300a, 300b. Each such subscription management entity 300a, 300b could be implemented in an SM-DP+ entity. In the illustrative example of FIG. 1, subscription management entity 300a is denoted SM-DP+.A and subscription management entity 300b is denoted SM-DP+.B. Hereinafter the subscription management entity 300a will be referred to as source subscription management entity 300a, and the subscription management entity 300b will be referred to as target subscription management entity 300b. Functionality of the subscription management entities 300a, 300b in relation to the herein disclosed embodiments will be disclosed below.

The communications system 100 further comprises at least two MNOs 400a, 400b. MNO 400a is associated with subscription management entity 300a and MNO 400b is associated with subscription management entity 300b. In the illustrative example of FIG. 1, MNO 400a is therefore denoted MNO.A and MNO 400b is denoted MNO.B.

The communications network 100 further comprises a Certificate Issuer (CI) 500. In the illustrative example of FIG. 1, CI 500 is denoted CI.A. Functionality of the CI 500 in relation to the herein disclosed embodiments will be disclosed below.

Dashed lines in FIG. 1 indicate operational connections.

The embodiments disclosed herein relate to mechanisms for handling network subscriptions of a subscriber entity 200 having a network subscription locked to the source subscription management entity 300a. In order to obtain such mechanisms there is provided a profile handling entity 250, 260, a method performed by the profile handling entity 250, 260, a computer program product comprising code, for example in the form of a computer program, that when run on processing circuitry of the profile handling entity 250, 260, causes the profile handling entity 250, 260 to perform the method. In order to obtain such mechanisms there is further provided a source subscription management entity 300a, a method performed by the source subscription management entity 300a, and a computer program product comprising code, for example in the form of a computer program, that when run on processing circuitry of the source subscription management entity 300a, causes the source subscription management entity 300a to perform the method. In order to obtain such mechanisms there is further provided a target subscription management entity 300b, a method performed by the target subscription management entity 300b, and a computer program product comprising code, for example in the form of a computer program, that when run on processing circuitry of the target subscription management entity 300b, causes the target subscription management entity 300b to perform the method.

Existing mechanisms for remote provision of the subscriber entity 200 can cater the requirement of downloading a SIM profile to the eUICC 260 with which it has a trust relationship. The trust relationship is established by placing the CI's 500 public key in the eUICC 260, typically during manufacturing of the eUICC 260. Any subscription management entity 300*a*, 300*b* which obtains a certificate from the CI 500 can download the profile to the target eUICC 260. However, based on current practices, there are requirement to control which subscription management entity 300*a*, 300*b* can download profile to the eUICC 260. This can be a requirement for cases when the MNO 400*a*, 400*b* sells devices with subsidy and wants to control subscriber migration from one operator controlled subscription management entity 300*a* to another subscription management entity 300*b*.

Before describing the herein disclosed embodiments some general aspects of remote provisioning of a subscriber entity 200 will be disclosed.

In general terms, remote provisioning provides the facility to remotely download a profile in the eUICC 260. The security (i.e., trust) association between the subscription management entity 300*a* and the eUICC 260 is defined by the CI 500 acting as a trust anchor (hence the notation CI.A in FIG. 1). Only the trusted (as signed by the CI 500) subscription management entity 300*a* can send profile towards the eUICC 260. The security association is based on initial trust anchor (in the GSMA specification SGP.22 referred to PK.CI.ECDSA; where PK is short for public key, and ECDSA is short for elliptic curve DSA and DSA is short for Digital Signature Algorithm, i.e., PK.CI.ECDSA is the public key of the CI 500) placed in the eUICC 260 by the eUICC manufacturer (EUM). Any subscription management entity 300*a*, 300*b* which later on certifies itself with the CI 500 of the eUICC manufacturer is allowed to download profiles to the eUICC 260. In this respect, any certificate signed by the CI 500 of the EUM is trusted by the eUICC 260 (because of the initial trust anchor set up and its certificate chain). With this setup, the CI 500 of the EUM controls which entity may or may not download a profile to the eUICC 260. There can be multiple subscription management entities 300*a*, 300*b* at a single point of time that are enabled to download profiles to the same eUICC 260. However, from the perspective of the MNOs 400*a*, 400*b*, it can be desirable to control the ownership (by means of a lock-in mechanism) of the eUICC 260, i.e., to selectively control which subscription management entity or entities 300*a*, 300*b* can download a profile to the eUICC 260 during the life cycle of the eUICC 260.

Hereinafter will be disclosed mechanisms to control eUICC profile download by a specific subscription management entity 300*a*, 300*b*. This is achieved by introducing necessary enforcement mechanisms.

Assume for illustrative purposes that there is an eUICC manufacturer A having manufactured eUICCs denoted eUICC.A1, eUICC.A2, eUICC.A3 etc., one of which is illustrated in FIG. 1. Assume further that CI.A is the trust anchor trusted by all eUICCs from eUICC manufacturer A. At eUICC bootstrapping, subscription management entity SM-DP+.A is, by default, trusted by CI.A, because CI.A has already signed a certificate of subscription management entity SM-DP+.A. Thus, initially, there is a trust relationship between eUICCs from eUICC manufacturer A and subscription management entity SM-DP+.A. Subscription management entity SM-DP+.A will hence hereinafter be referred to as the source subscription management entity 300*a*.

Furthermore, assume that eUICC.A is locked to SM-DP+.A. I.e., eUICC 260 is locked to the source subscription management entity 300*a*. Assume still further that the subscriber entity 200 requests to download a profile of MNO.B associated with SM-DP+.B. Subscription management entity SM-DP+.B will hence hereinafter be referred to as the target subscription management entity 300*b*. Then either MNO.B has a SM-DP+.B which has no trust relationship with the CI 500 of the eUICC.A (case 1), or the MNO.B has SM-DP+.B and has an existing trusted relationship with CI 500 (case 2).

In case 1, for the subscriber entity 200 to be able to download the profile of MNO.B via SM-DP+.B, SM-DP+.B requires a signed certificate from the CI of eUICC.A, i.e., from CI.A so that eUICC.A has a trust chain for SM-DP+.B. After that, SM-DP+.A still has to approve SM-DP+.B for eUICC.A to be able to download a profile from SM-DP+.B.

For case 2, SM-DP+.B has already a signed certificate from CI.A. Thus, SM-DP+.B only requires approval from SM-DP+.A.

Figure 2:
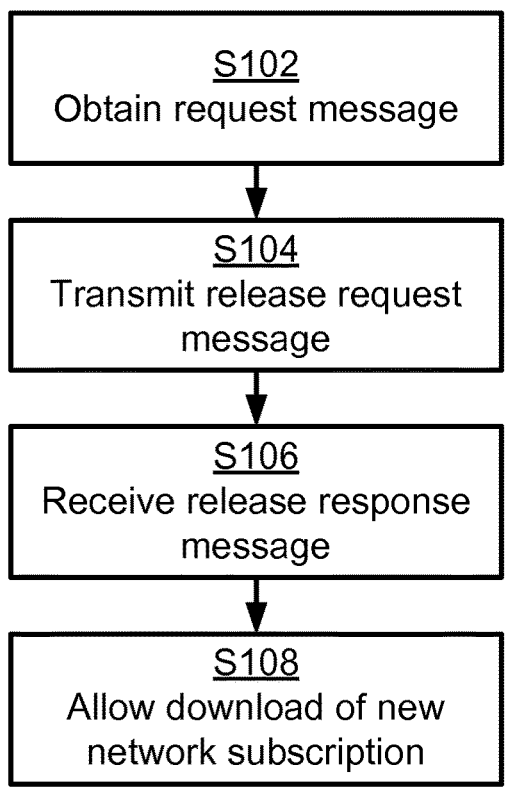
FIGS. 2, 3, 4, 5, 6, and 7 are flowcharts of methods according to embodiments.
Figure 3:
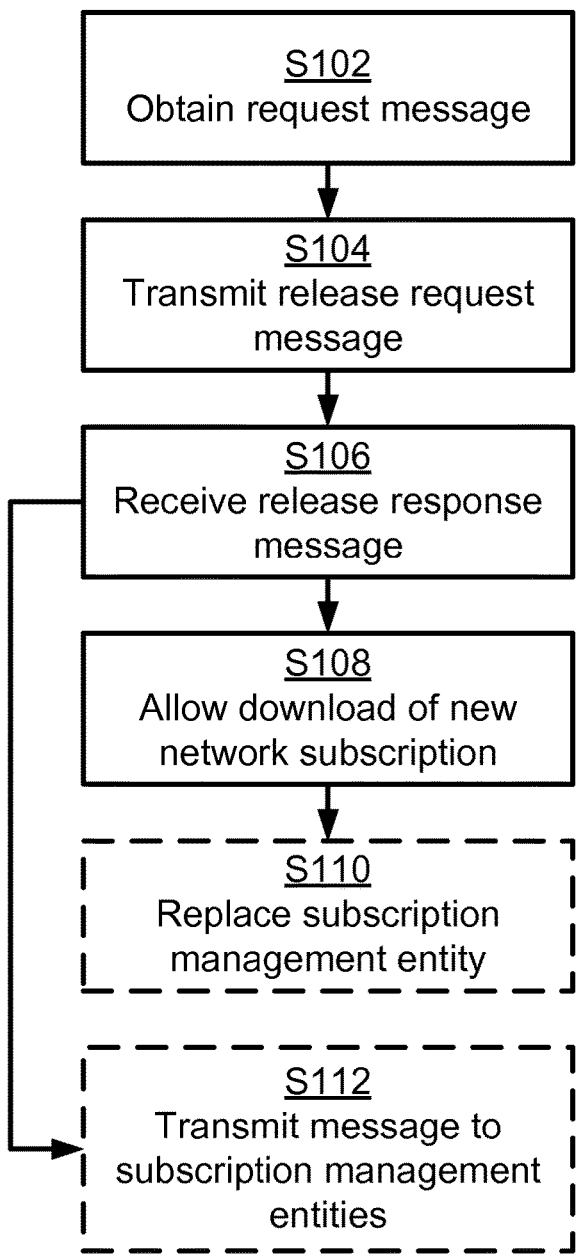
Figure 4:
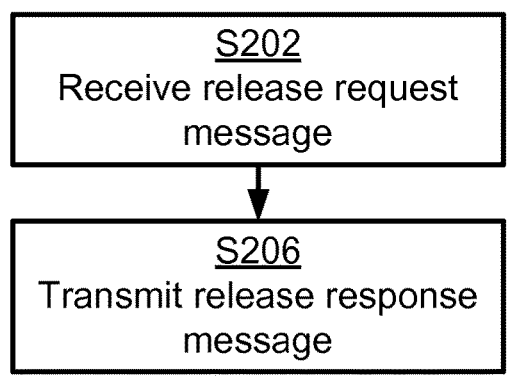
Figure 5:
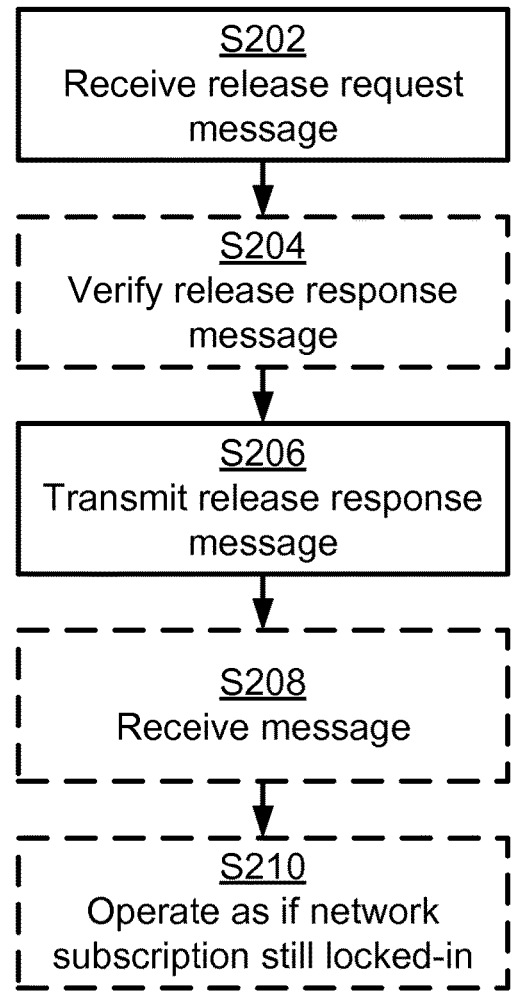
Figure 6:
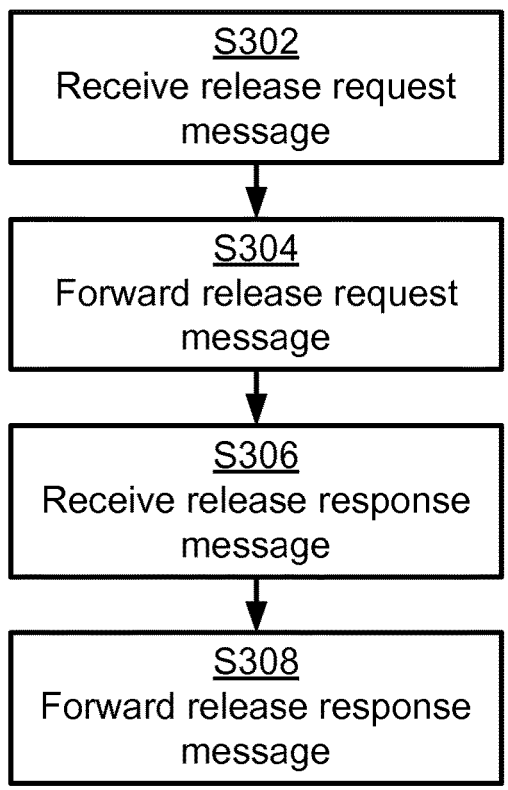
Figure 7:
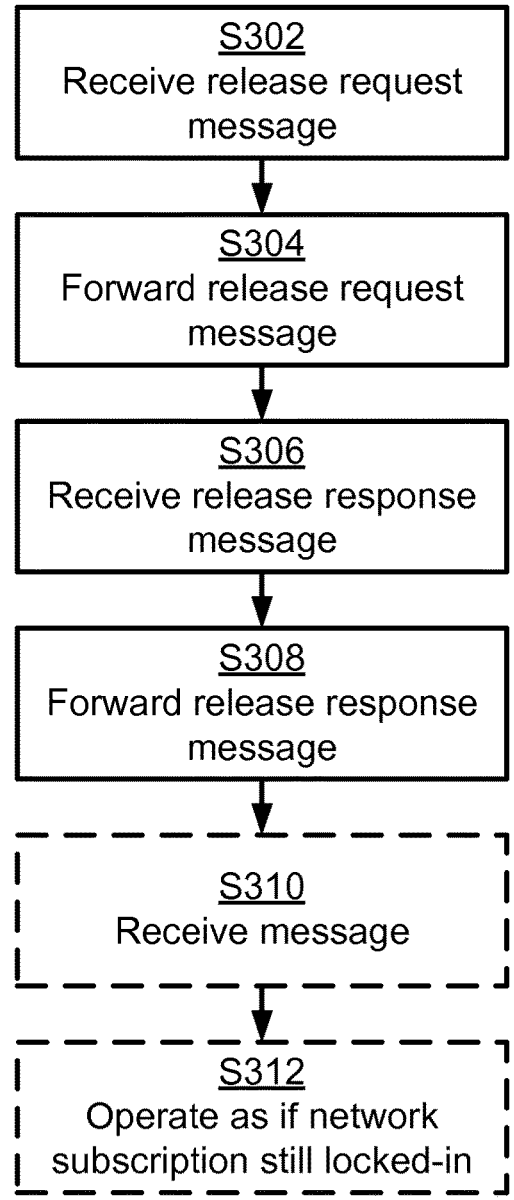

FIGS. 2 and 3 are flow charts illustrating embodiments of methods for handling network subscriptions of a subscriber entity 200 having a network subscription locked to the source subscription management entity 300*a* as performed by the profile handling entity 250, 260. FIGS. 4 and 5 are flow charts illustrating embodiments of methods for handling network subscriptions of a subscriber entity 200 having a network subscription locked to the source subscription management entity 300*a* as performed by the source subscription management entity 300*a*. FIGS. 6 and 7 are flow charts illustrating embodiments of methods for handling network subscriptions of a subscriber entity 200 having a network subscription locked to the source subscription management entity 300*a* as performed by the target subscription management entity 300*b*. The methods are advantageously provided as computer programs.

Reference is now made to FIG. 2 illustrating a method for handling network subscriptions of a subscriber entity 200 having a network subscription locked to the source subscription management entity 300*a* as performed by the profile handling entity 250, 260 according to an embodiment.

It is assumed that a new network subscription handled by the target subscription management entity 300*b* is to be downloaded to the subscriber entity 200. Hence the profile handling entity 250, 260 is configured to perform step S102:

S102: The profile handling entity 250, 260 obtains a request message for download of a new network subscription. The new network subscription is handled by the target subscription management entity 300*b*. The request message comprises identity information of the target subscription management entity 300*b*. Examples of the identity information will be provided below.

The profile handling entity 250, 260 could compare the identity information of the target subscription management entity 300*b* with reference identity information. If there is a match between the identity information and the reference identity information the profile handling entity 250, 260 could enable direct download of the new network subscription. However, this is not the case when there is a mismatch between the identity information and reference identity information. Hence the profile handling entity 250, 260 is configured to perform step S104:

S104: The profile handling entity 250, 260, when there is a mismatch between the identity information and reference identity information, transmits a release request message of the network subscription to the source subscription management entity 300*a* via the target subscription management entity 300*b*.

It is assumed that the source subscription management entity 300*a* receives the release request message via the target subscription management entity 300*b* and responds thereto with a release response message. Hence the profile handling entity 250, 260 is configured to perform step S106:

S106: The profile handling entity 250, 260 receives, from the source subscription management entity 300a via the target subscription management entity 300b, a release response message of the network subscription.

Depending on the release response message the profile handling entity 250, 260 could either allow or not allow download of new network subscription to the subscriber entity 200. Hence the profile handling entity 250, 260 is configured to perform step S108:

S108: The profile handling entity 250, 260 allows the target subscription management entity 300b to download the new network subscription to the subscriber entity 200 upon the profile handling entity 250, 260 having successfully verified the release response message. The release response message could indicate that the source subscription management entity 300a allows the target subscription management entity 300b to download the new network subscription to the subscriber entity 200.

This enables the ownership of eUICC 260 to be changed from one (source) subscription management entity 300a to another (target) subscription management entity 300b during the life cycle of eUICC 260. For example, and as will be further disclosed below, the release response message could specify either that the target subscription management entity 300b is the new owner of the subscriber entity 200, or that the target subscription management entity 300b is allowed to download one profile to the subscriber entity 200 whilst the source subscription management entity 300a remains as the owner, or that the target subscription management entity 300b is not allowed to download any profile to the subscriber entity 200.

Reference is now made to FIG. 3 illustrating methods for handling network subscriptions of a subscriber entity 200 having a network subscription locked to the source subscription management entity 300a as performed by the profile handling entity 250, 260 according to further embodiments. It is assumed that steps S102, S104, S106, S108 are performed as described above with reference to FIG. 2 and a thus repeated description thereof is therefore omitted.

There may be different examples of identity information. An example of the identity information is a certificate. Then, according to an embodiment, the reference identity information is a certificate that comprises an identification of the source subscription management entity 300a.

There may be different examples of release request messages. According to an embodiment the release request message comprises an identification of the target subscription management entity 300b.

Further, the profile handling entity 250, 260 could sign the entire release request message to ensure its authenticity and integrity. Otherwise, the target subscription management entity 300b could change the request message at its will, which could create an attack surface for a compromised subscription management entity. Alternatively, the profile handling entity 250, 260 could sign only part of the release request message. This alternative could be used when the communication between the profile handling entity 250, 260 and the subscription management entities 300a, 300b is secure. Thus, according to an embodiment at least part of the release request message is signed by the profile handling entity 250, 260. The thus signed part of the release request message could be protected e.g. by comprising a replay protected sequence, such as a nonce, a sequence number, and/or a timestamp.

According to an embodiment at least part of the release response message is signed by the source subscription management entity 300a. The thus signed part of the release response message could comprise a replay protected sequence.

There could be different ways for the profile handling entity 250, 260 to perform the verification of the release response message. According to an embodiment the verification of the release response message comprises comparing the release response message to the identity information of the source subscription management entity 300a. In more detail, the profile handling entity 250, 260 could verify the response by verifying that the source subscription management entity 300a has indeed signed the message (or part of it) using the identity/public key stored as a reference identity.

There could be different examples of where to store the reference identity information. According to an embodiment the reference identity information is stored by the profile handling entity 250, 260. For example the reference identity information could be stored by the storage medium 230 (see below).

According to an embodiment the source subscription management entity 300a is replaced with the target subscription management entity 300b as subscription management entity for the subscriber entity 200 upon successful verification. This could cause the subscriber entity 200 to be to the target subscription management entity 300b and thus the the target subscription management entity 300b to act as owner subscription management entity of the subscriber entity 200. Hence according to an embodiment the profile handling entity 250, 260 is configured to perform step S110:

S110: The profile handling entity 250, 260, upon successful verification of the release response message, replaces the source subscription management entity 300a with the target subscription management entity 300b as subscription management entity for the subscriber entity 200.

Further, according to some aspects, user consent is required as part of the verification. That is, according to an embodiment, the source subscription management entity 300a is replaced with the target subscription management entity 300b (as subscription management entity for the subscriber entity 200) only after verification received from a user interface.

If the verification of the release response message is not successful or if the release response message indicates that the source subscription management entity 300a does not allow the target subscription management entity 300b to download one profile or become owner, the profile handling entity 250, 260 does not allow the destination subscription management entity 300b to download the new network subscription to the subscriber entity 200. The profile handling entity 250, 260 could further be configured to notify at least the target subscription management entity 300b of this. Hence according to an embodiment the profile handling entity 250, 260 is configured to perform step S112:

S112: The profile handling entity 250, 260, upon unsuccessful verification of the release response message (or if the user denies the change), transmits a message at least to the target subscription management entity 300b that the target subscription management entity 300b was not allowed to download a new network subscription to the subscriber entity 200. This message could also be transmitted to the source subscription management entity 300a such that the source subscription management entity 300a is made aware of that the profile handling entity 250, 260 explicitly did not allow download of the new network subscription to the subscriber entity 200.

In summary, according to a first scenario the release response message is a success response that allows the profile to be downloaded from the target subscription management entity 300b (and, optionally, the lock from the source subscription management entity 300a is removed). However, if there is user consent requested and the user denies this change then the profile handling entity 250, 260 will send a message as in step S112. According to second scenario the release response message is a negative response for releasing the lock, thus not allowing the profile to be downloaded from the target subscription management entity 300b. In this second scenario, the source subscription management entity 300a does not need to receive any message as in step S112 as it already knows that it is still the manager of the profile handling entity 250, 260.

Reference is now made to FIG. 4 illustrating a method for handling network subscriptions of a subscriber entity 200 having a network subscription locked to the source subscription management entity 300a as performed by the source subscription management entity 300a according to an embodiment.

As disclosed above, the profile handling entity 250, 260 in step S104 transmits a release request message of the network subscription to the source subscription management entity 300a via the target subscription management entity 300b. It is here assumed that the release request message is received by the source subscription management entity 300a. Hence the source subscription management entity 300a is configured to perform step S202:

S202: The source subscription management entity 300a receives, from the profile handling entity 250, 260 and via the target subscription management entity 300b, a release request message of the network subscription.

The source subscription management entity 300a responds to the release request message with a release response message. Hence the source subscription management entity 300a is configured to perform step S206:

S206: The source subscription management entity 300a transmits a release response message of the network subscription to the profile handling entity 250, 260 via the target subscription management entity 300b. The source subscription management entity 300a thereby enables the profile handling entity 250, 260 to download a new network subscription from the target subscription management entity 300b to the subscriber entity 200 upon successful verification of the release response message.

Reference is now made to FIG. 5 illustrating methods for handling network subscriptions of a subscriber entity 200 having a network subscription locked to the source subscription management entity 300a as performed by the source subscription management entity 300a according to further embodiments. It is assumed that steps S202 and S206 are performed as described above with reference to FIG. 4 and a thus repeated description thereof is therefore omitted.

As disclosed above, according to an embodiment at least part of the release request message is signed by the profile handling entity 250, 260. According to an embodiment this at least part of the release request message is also signed by the target subscription management entity 300b.

The source subscription management entity 300a could then verify the release request message by verifying the signatures of the profile handling entity 250, 260 and the target subscription management entity 300b. Further, the release request message could comprise a replay protected sequence and hence according to an embodiment the source subscription management entity 300a is configured to perform step S204:

S204: The source subscription management entity 300a, when the release request message comprises a replay protected sequence, verifies the release request message by verifying signatures of the profile handling entity 250, 260 and the target subscription management entity 300b in the release request message and by verifying the replay protected sequence.

As disclosed above, according to an embodiment at least part of the release response message is signed by the source subscription management entity 300a.

As disclosed above, according to an embodiment the profile handling entity 250, 260 in step S112 transmits a message that the target subscription management entity 300b was not allowed to download the new network subscription to the subscriber entity 200. This message could be transmitted to the source subscription management entity 300a. Hence according to an embodiment the source subscription management entity 300a is configured to perform step S208:

S208: The source subscription management entity 300a receives a message from the profile handling entity 250, 260 that the target subscription management entity 300b was not allowed to download the new network subscription to the subscriber entity 200.

Upon having received the message in step S208 the source subscription management entity 300a then operates as if the target subscription management entity 300b was not allowed to download the new network subscription to the subscriber entity 200. Hence according to an embodiment the source subscription management entity 300a is configured to perform step S210:

S210: The source subscription management entity 300a operates as the network subscription is still locked to the source subscription management entity 300a in response thereto (i.e., in response to having received the message in step S208).

Reference is now made to FIG. 6 illustrating a method for handling network subscriptions of a subscriber entity 200 having a network subscription locked to the source subscription management entity 300a as performed by the target subscription management entity 300b according to an embodiment.

As disclosed above, the profile handling entity 250, 260 in step S104 transmits a release request message of the network subscription to the source subscription management entity 300a via the target subscription management entity 300b. It is here assumed that the release request message is received by the target subscription management entity 300b. Hence the target subscription management entity 300b is configured to perform step S302:

S302: The target subscription management entity 300b receives, from the profile handling entity 250, 260, a release request message of the network subscription.

The target subscription management entity 300b then forwards the release request message to the source subscription management entity 300a. Hence the target subscription management entity 300b is configured to perform step S304:

S304: The target subscription management entity 300b forwards the release request message to the source subscription management entity 300a.

As disclosed above, the source subscription management entity 300a in step S206 transmits a release response message of the network subscription to the profile handling entity 250, 260 via the target subscription management entity 300b. It is here assumed that the release response message is received by the target subscription management entity 300b. Hence the target subscription management entity 300b is configured to perform step S306:

S306: The target subscription management entity 300b receives a release response message of the network subscription from the source subscription management entity 300a.

The target subscription management entity 300b then forwards the release response message to the profile handling entity 250, 260. Hence the target subscription management entity 300b is configured to perform step S308:

S308: The target subscription management entity 300b forwards the release response message to the profile handling entity 250, 260. The target subscription management entity 300b thereby enables the profile handling entity 250, 260 to download a new network subscription from the target subscription management entity 300b to the subscriber entity 200 upon successful verification of the release response message.

Reference is now made to FIG. 7 illustrating methods for handling network subscriptions of a subscriber entity 200 having a network subscription locked to the source subscription management entity 300a as performed by the target subscription management entity 300b according to further embodiments. It is assumed that steps S302, S304, S306, S308 are performed as described above with reference to FIG. 6 and a thus repeated description thereof is therefore omitted.

As disclosed above, according to an embodiment the release request message forwarded by the target subscription management entity 300b comprises a replay protected sequence at least signed by the target subscription management entity 300b, and the release response message received from the source subscription management entity 300a comprises this replay protected sequence also signed by the source subscription management entity 300a.

As disclosed above, according to an embodiment the profile handling entity 250, 260 in step S112 transmits a message at least to the target subscription management entity 300b that the target subscription management entity 300b was not allowed to download the new network subscription to the subscriber entity 200. Hence according to an embodiment the target subscription management entity 300b is configured to perform step S310:

S310: The target subscription management entity 300b receives a message from the profile handling entity 250, 260 that the target subscription management entity 300b was not allowed to download a new network subscription to the subscriber entity 200.

Upon having received the message in step S310 the target subscription management entity 300b then operates as if the target subscription management entity 300b was not allowed to download the new network subscription to the subscriber entity 200. Hence according to an embodiment the target subscription management entity 300b is configured to perform step S312:

S312: The target subscription management entity 300b operates as the network subscription is still locked to the source subscription management entity 300a in response thereto (i.e., in response to having received the message in step S310.

If the source subscription management 300a only gives permission for one single profile download from the target subscription management 300b, then the subscription management information stored in the ISD-R 250 may not be changed.

Using the herein disclosed embodiments, a subscription management 300a, 300b can manage ownership for a set of eUICCs 260. The subscription management 300a, 300b can change the ownership of subscription management for the eUICC 260 during the life cycle of the eUICC 260.

Using the herein disclosed embodiments it is possible to remove the ownership lock by the source subscription management 300a. For removing ownership lock, either the source subscription management 300a, the target subscription management 300b, or the eUICC 260 itself, can make a request for release control. In response, a signed message from the source subscription management 300a with remove lock is received. If the source subscription management 300a approves the release lock, the ISD-R 250 clears its storage of source subscription management certificates and disables the control lock of source subscription managements. This removes the lock with a particular source subscription management entity 300a.

Figure 8:
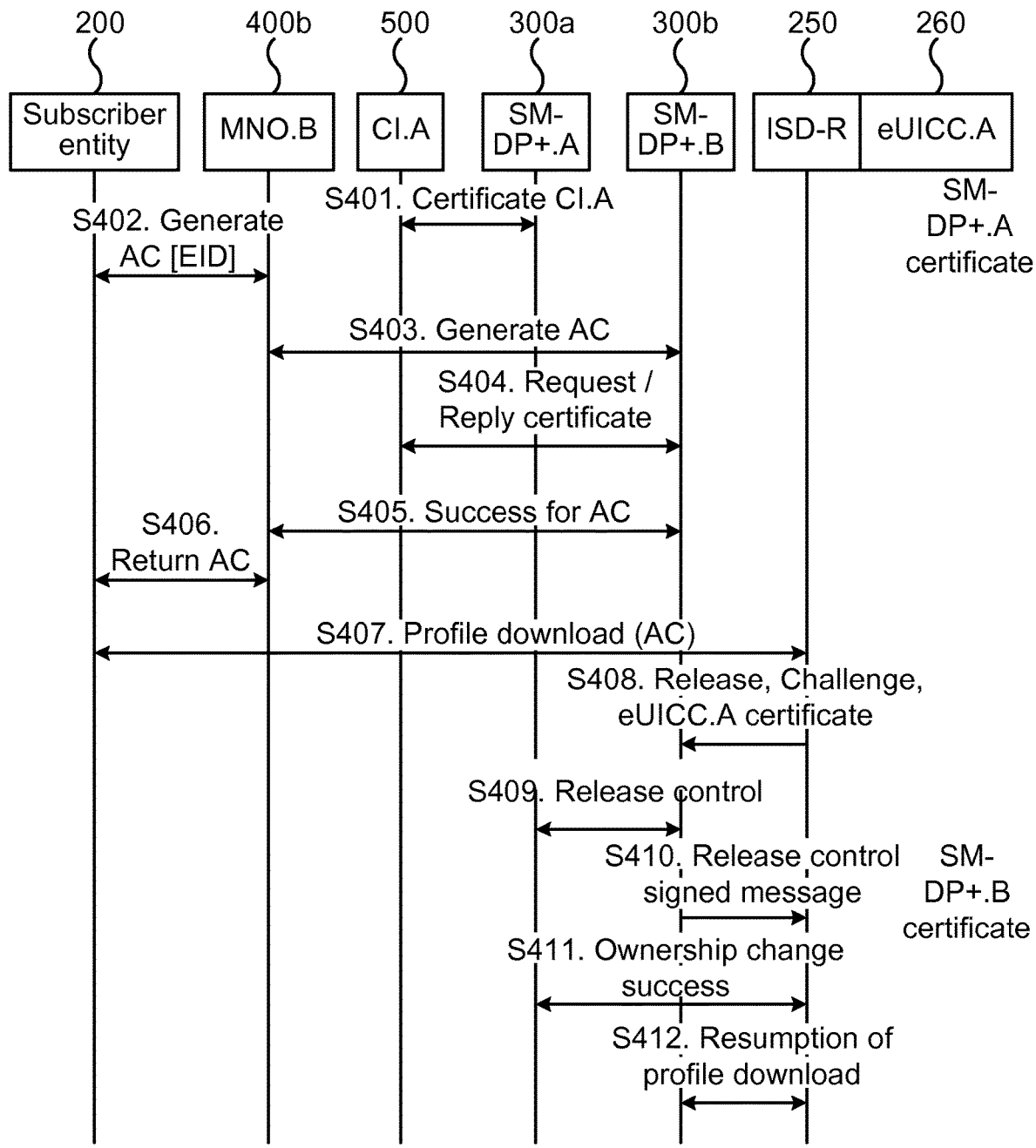
FIG. 8 is a signalling diagram according to an embodiment.

One particular embodiment for handling network subscriptions of a subscriber entity 200 having a network subscription locked to the source subscription management entity 300a based on at least some of the above disclosed embodiments will now be disclosed in detail with reference to the signalling diagram of FIG. 8.

S401: Public key (PK.CI) of the eUICC manufacturer's CI 500 is embedded in eUICC.A (i.e., eUICC 260). In addition, a certificate and ID of the source subscription management entity 300a is stored in the profile handling unit 250, 260, e.g. at the manufacturing. This defines the ownership of eUICC.A of the profile handling unit 250, 260 to SM-DP+.A (i.e., to the source subscription management entity 300a). Alternatively, eUICC.A could be manufactured with a locking mechanism enabled but without information about SM-DP+.A. Then, the first subscription management entity to be successfully used for downloading a profile to the subscriber entity 200 will be defined as the source subscription management entity.

S402: eUICC.A requests a profile from MNO.B (i.e., MNO 400b). To perform this, the subscriber entity 200 contacts (optionally with its EID or IMEI) MNO.B and requests a subscription.

S43: MNO.B sends a profile generation request to SM-DP+.B (i.e., the target the subscription management entity 300b). MNO.B checks the manufacturer of eUICC.A (e.g., based on EID) using its local database, or using a DNS-type query service at which by providing an EID as input it is possible to get the manufacturer information. MNO.B checks if SM-DP+.B (i.e., the target subscription management entity 300b) has an existing trust relationship with the manufacturer of eUICC.A. If it does not exist, step S404 takes place.

S404: SM-DP+.B sends its public key to CI.A. In return, depending on contractual relationship, CI.A signs a certificate for SM-DP+.B. SM-DP+.B stores the certificate signed by CI.A.

S405: SM-DP+.B generates an activation code (AC) and returns it to MNO.B, or MNO.B generates one by itself.

S406. The AC is returned from MNO.B to the subscriber entity 200.

S407: The subscriber entity 200 provides the AC to the eUICC 260 for the eUICC 260 to download the profile (the AC should include the identity of SM-DP+.B) which in turn initiates the profile download process. Profile download then follows the technical specification SGP.22 until step 10 as described in section 3.B.2 thereof. At step 10, eUICC.A verifies the certificate of SM-DP+.B using the public key of CI.A as embedded in eUICC.A. If the verification is successful, eUICC.A allows profile download.

S408: If there is a mismatch between the existing SM-DP+ certificates stored in ISD-R 250 and in the request message and an SM-DP+ locking mechanism exists in ISD-R 250, ISD-R 250 transmits a release request message to SM-DP+.A via SM-DP+.B. The release request message contains a replay protected sequence (such as a nonce, a sequence number, and/or a timestamp or another entity that provides replay protection), and an identity of SM-DP+.B signed by eUICC.A (SK.EUICC.ECDSA). SM-DP+.B forwards the message to SM-DP+.A. During the forwarding, SM-DP+.B signs the message. The signing by eUICC.A ensures that eUICC.A approves to change ownership. The signing by SM-DP+.B ensures that SM-DP+.B approves obtaining ownership of eUICC.A from SM-DP+.A.

S409: If an agreement exists between SM-DP+.A and SM-DP+.B, or SM-DP+.A otherwise allows releasing ownership of eUICC.A, a response message to the release request message is transmitted from SM-DP+.A via SM-DP+.B to ISD-R 250. Before transmitting the release request, SM-DP+.A checks that the release request is a valid request (as verified using the signature of eUICC.A and SM-DP+.B) and that the request message is not replayed (as verified using e.g., uniqueness of the replay protected sequence). If both checks are successful, a release response is transmitted back. The release response message comprises the earlier replay protected sequence signed by SM-DP+.A. Further information can be added to define the degree of release i.e., if only download of one profile is allowed, or if the ownership is to be fully changed (or added if both SM-DP+.A and SM-DP+.B should be allowed to download profiles), or if the lock-in mechanism is to be removed.

S410: The ISD-R 250 verifies the release response. The verification is performed using the stored certificate of SM-DP+.A. ISD-R 250, optionally, also request for user consent (through a user interface) to set the new ownership. If the response authorizes changes to SM-DP+ ownership (e.g., from SM-DP+.A to SM-DP+.B), ISD-R 250 deletes SM-DP+.A and adds SM-DP+.B as the new owner of eUICC.A. This enforces ownership of eUICC.A. Thus, profile download is only allowed from SM-DP+.B.

S411: If the user refuses to change the ownership, a message signed by eUICC.A is transmitted to SM-DP+.B and SM-DP+.A (e.g. via SM-DP+.A to SM-DP+.B) that the ownership change request was not fulfilled. Both SM-DP+.B and SM-DP+.A roll back to their previous owner state with respect to eUICC.A. This ensures consistency of ownership state across devices and nodes.

From here on, the profile download process follows the technical specification SGP.22.

Figure 9:
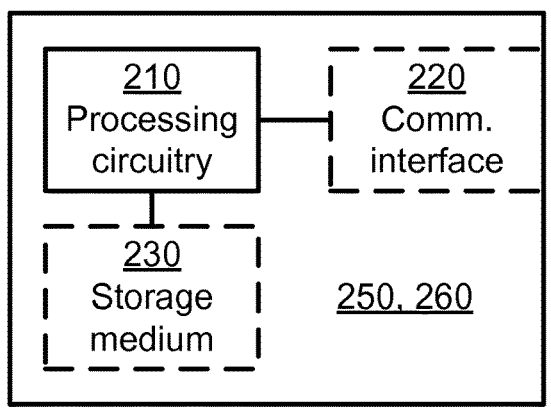
FIG. 9 is a schematic diagram showing functional units of a profile handling entity according to an embodiment.

FIG. 9 schematically illustrates, in terms of a number of functional units, the components of a profile handling entity 250, 260 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510a (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the profile handling entity 250, 260 to perform a set of operations, or steps, S102-S112, as disclosed above. For example, the storage medium 230 may store the set of operations, and the processing circuitry 210 may be configured to retrieve the set of operations from the storage medium 230 to cause the profile handling entity 250, 260 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The profile handling entity 250, 260 may further comprise a communications interface 220 for communications at least with the source subscription management entity 300a and the target subscription management entity 300b. As such the communications interface 220 may comprise one or more transmitters and receivers, comprising analogue and digital components.

The processing circuitry 210 controls the general operation of the profile handling entity 250, 260 e.g. by sending data and control signals to the communications interface 220 and the storage medium 230, by receiving data and reports from the communications interface 220, and by retrieving data and instructions from the storage medium 230. Other components, as well as the related functionality, of the profile handling entity 250, 260 are omitted in order not to obscure the concepts presented herein.

Figure 10:
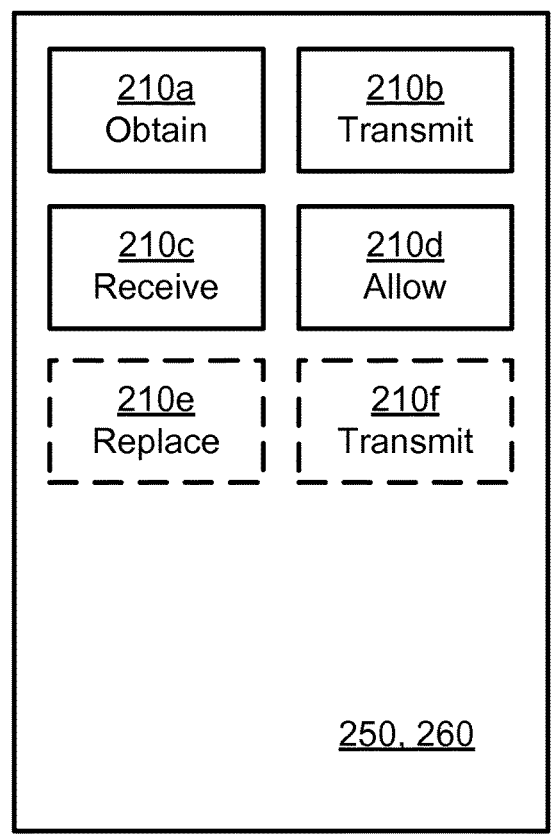
FIG. 10 is a schematic diagram showing functional modules of a profile handling entity according to an embodiment.

FIG. 10 schematically illustrates, in terms of a number of functional modules, the components of a profile handling entity 250, 260 according to an embodiment. The profile handling entity 250, 260 of FIG. 10 comprises a number of functional modules; an obtain module 210a configured to perform step S102, a transmit module 210b configured to perform step S104, a receive module 210c configured to perform step S106, and an module 210d configured to perform step S108. The profile handling entity 250, 260 of FIG. 10 may further comprise a number of optional functional modules, such as any of a replace module 210e configured to perform step S110 and a transmit module 210f configured to perform step S112. In general terms, each functional module 210a-210f may be implemented in hardware or in software. Preferably, one or more or all functional modules 210a-210f may be implemented by the processing circuitry 210, possibly in cooperation with functional units 220 and/or 230. The processing circuitry 210 may thus be arranged to from the storage medium 230 fetch instructions as provided by a functional module 210a-210f and to execute these instructions, thereby performing any steps of the profile handling entity 250, 260 as disclosed herein.

Figure 11:
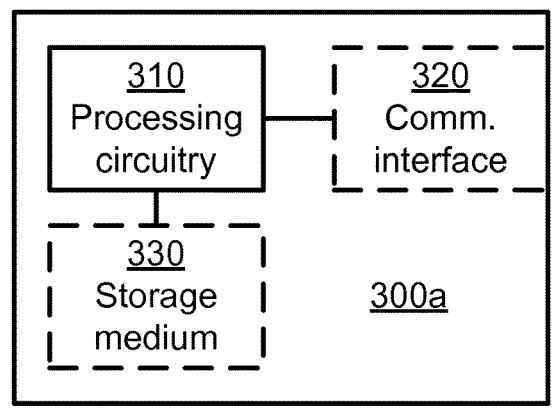
FIG. 11 is a schematic diagram showing functional units of a source subscription management entity according to an embodiment.

FIG. 11 schematically illustrates, in terms of a number of functional units, the components of a source subscription management entity 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1510b (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the source subscription management entity 300a to perform a set of operations, or steps, S202-S210, as disclosed above. For example, the storage medium 330 may store the set of operations, and the processing circuitry 310 may be configured to retrieve the set of operations from the storage medium 330 to cause the source subscription management entity 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The source subscription management entity 300a may further comprise a communications interface 320 for communications at least with the target subscription management entity 300b and the profile handling entity 250, 260. As such the communications interface 320 may comprise one or more transmitters and receivers, comprising analogue and digital components.

The processing circuitry 310 controls the general operation of the source subscription management entity 300a e.g. by sending data and control signals to the communications interface 320 and the storage medium 330, by receiving data and reports from the communications interface 320, and by retrieving data and instructions from the storage medium 330. Other components, as well as the related functionality, of the source subscription management entity 300a are omitted in order not to obscure the concepts presented herein.

Figure 12:
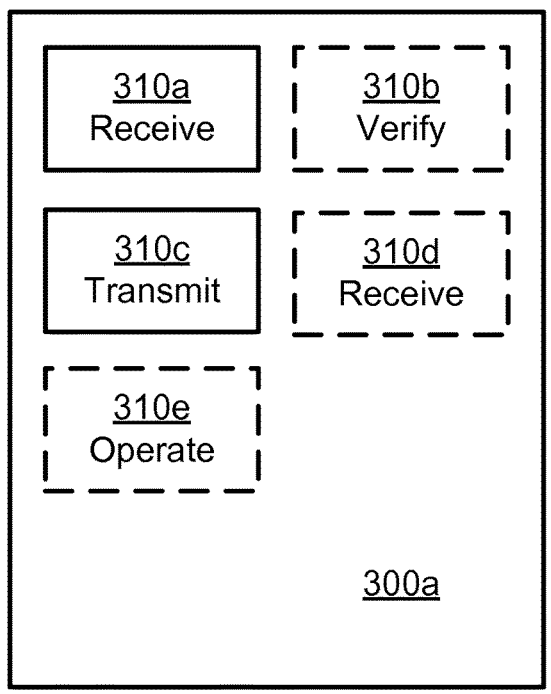
FIG. 12 is a schematic diagram showing functional modules of a source subscription management entity according to an embodiment.

FIG. 12 schematically illustrates, in terms of a number of functional modules, the components of a source subscription management entity 300a according to an embodiment. The source subscription management entity 300a of FIG. 12 comprises a number of functional modules; a receive module 310a configured to perform step S202, and a transmit module 210c configured to perform step S206. The source subscription management entity 300a of FIG. 12 may further comprises a number of optional functional modules, such as any of a verify module 310b configured to perform step S204, a receive module 310d configured to perform step S208, and an operate module 310e configured to perform step S210. In general terms, each functional module 310a-310e may be implemented in hardware or in software. Preferably, one or more or all functional modules 310a-310e may be implemented by the processing circuitry 310, possibly in cooperation with functional units 320 and/or 330. The processing circuitry 310 may thus be arranged to from the storage medium 330 fetch instructions as provided by a functional module 310a-310e and to execute these instructions, thereby performing any steps of the source subscription management entity 300a as disclosed herein.

Figure 13:
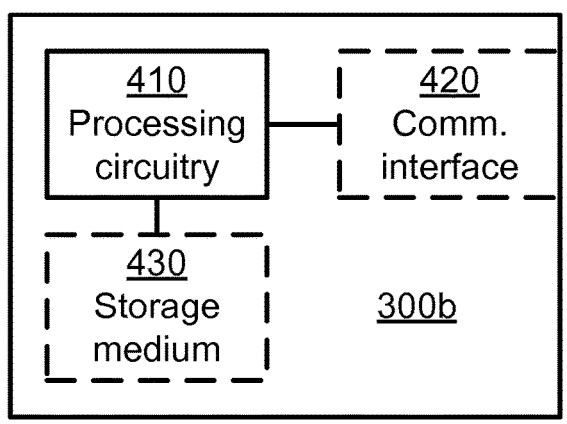
FIG. 13 is a schematic diagram showing functional units of a target subscription management entity according to an embodiment.

FIG. 13 schematically illustrates, in terms of a number of functional units, the components of a target subscription management entity 300b according to an embodiment. Processing circuitry 410 is provided using any combination of one or more of a suitable central processing unit (CPU), multiprocessor, microcontroller, digital signal processor (DSP), etc., capable of executing software instructions stored in a computer program product 410c (as in FIG. 15), e.g. in the form of a storage medium 430. The processing circuitry 410 may further be provided as at least one application specific integrated circuit (ASIC), or field programmable gate array (FPGA).

Particularly, the processing circuitry 410 is configured to cause the target subscription management entity 300b to perform a set of operations, or steps, S302-S312, as disclosed above. For example, the storage medium 430 may store the set of operations, and the processing circuitry 410 may be configured to retrieve the set of operations from the storage medium 430 to cause the target subscription management entity 300b to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The target subscription management entity 300b may further comprise a communications interface 420 for communications at least with the source subscription management entity 300a and the profile handling entity 250, 260. As such the communications interface 420 may comprise one or more transmitters and receivers, comprising analogue and digital components.

The processing circuitry 410 controls the general operation of the target subscription management entity 300b e.g. by sending data and control signals to the communications interface 420 and the storage medium 430, by receiving data and reports from the communications interface 420, and by retrieving data and instructions from the storage medium 430. Other components, as well as the related functionality, of the target subscription management entity 300b are omitted in order not to obscure the concepts presented herein.

Figure 14:
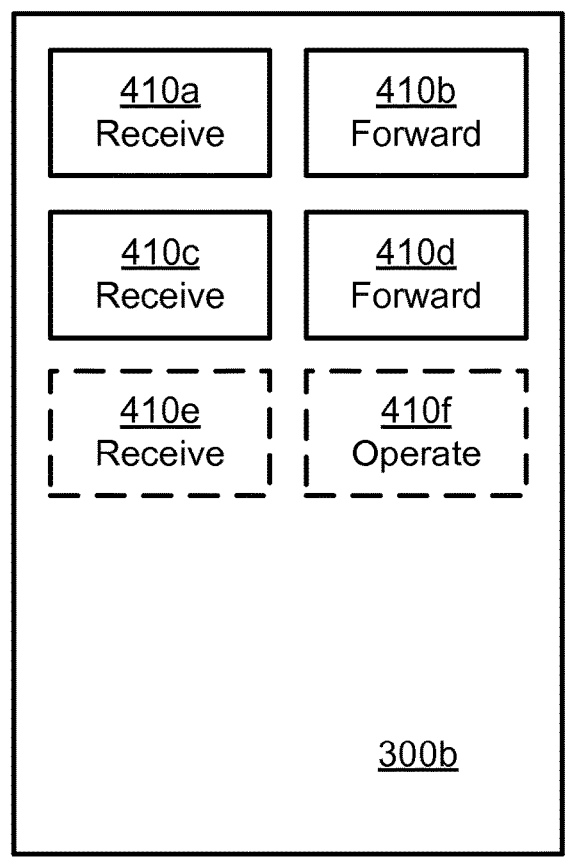
FIG. 14 is a schematic diagram showing functional modules of a target subscription management entity according to an embodiment.

FIG. 14 schematically illustrates, in terms of a number of functional modules, the components of a target subscription management entity 300b according to an embodiment. The target subscription management entity 300b of FIG. 14 comprises a number of functional modules; a receive module 410a configured to perform step S302, a forward module 410b configured to perform step S304, a receive module 410c configured to performs step S306, and a forward module 410d configured to perform step S308. The target subscription management entity 300b of FIG. 14 may further comprises a number of optional functional modules, such as any of a receive module 410e configured to perform step S310 and an operate module 410f configured to perform step S312. In general terms, each functional module 410a-410f may be implemented in hardware or in software. Preferably, one or more or all functional modules 410a-410f may be implemented by the processing circuitry 410, possibly in cooperation with functional units 420 and/or 430. The processing circuitry 410 may thus be arranged to from the storage medium 430 fetch instructions as provided by a functional module 410a-410f and to execute these instructions, thereby performing any steps of the target subscription management entity 300b as disclosed herein.

The subscription management entity 300a, 300b may be provided as a standalone device or as a part of at least one further device. For example, the subscription management entity 300a, 300b may be provided in a node of a service network or in a node of a core network. Alternatively, functionality of the subscription management entity 300a, 300b may be distributed between at least two devices, or nodes. These at least two nodes, or devices, may either be part of the same network part (such as the service network or the core network) or may be spread between at least two such network parts.

Thus, a first portion of the instructions performed by the subscription management entity 300a, 300b may be executed in a first device, and a second portion of the of the instructions performed by the subscription management entity 300a, 300b may be executed in a second device; the herein disclosed embodiments are not limited to any particular number of devices on which the instructions performed by the subscription management entity 300a, 300b may be executed. Hence, the methods according to the herein disclosed embodiments are suitable to be performed by a subscription management entity 300a, 300b residing in a cloud computational environment. Therefore, although a single processing circuitry 310, 410 is illustrated in FIGS. 11 and 13 the processing circuitry 310, 410 may be distributed among a plurality of devices, or nodes. The same applies to the functional modules 310a-310e and 410a-410f of FIGS. 12 and 14 and the computer programs 1520b, 1520c of FIG. 15 (see below).

Figure 15:
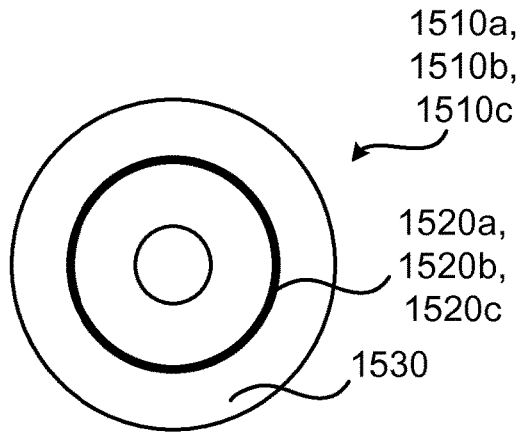
FIG. 15 shows one example of a computer program product comprising computer readable means according to an embodiment.

FIG. 15 shows one example of a computer program product 1510a, 1510b, 1510c comprising computer readable means 1530. On this computer readable means 1530, a computer program 1520a can be stored, which computer program 1520a can cause the processing circuitry 210 and thereto operatively coupled entities and devices, such as the communications interface 220 and the storage medium 230, to execute methods according to embodiments described herein. The computer program 1520a and/or computer program product 1510a may thus provide means for performing any steps of the profile handling entity 250, 260 as herein disclosed. On this computer readable means 1530, a computer program 1520b can be stored, which computer program 1520b can cause the processing circuitry 310 and thereto operatively coupled entities and devices, such as the communications interface 320 and the storage medium 330, to execute methods according to embodiments described herein. The computer program 1520b and/or computer program product 1510b may thus provide means for performing any steps of the source subscription management entity 300a as herein disclosed. On this computer readable means 1530, a computer program 1520c can be stored, which computer program 1520c can cause the processing circuitry 410 and thereto operatively coupled entities and devices, such as the communications interface 420 and the storage medium 430, to execute methods according to embodiments described herein. The computer program 1520c and/or computer program product 1510c may thus provide means for performing any steps of the target subscription management entity 300b as herein disclosed.

In the example of FIG. 15, the computer program product 1510a, 1510b, 1510c is illustrated as an optical disc, such as a CD (compact disc) or a DVD (digital versatile disc) or a Blu-Ray disc. The computer program product 1510a, 1510b, 1510c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520a, 1520b, 1520c is here schematically shown as a track on the depicted optical disk, the computer program 1520a, 1520b, 1520c can be stored in any way which is suitable for the computer program product 1510a, 1510b, 151c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling network subscriptions of a terminal device comprising a profile handling entity, wherein a network subscription for the terminal device is locked to a source subscription management entity, the method comprising:
the profile handing entity of the terminal device obtaining a request message for a download of a new network subscription handled by a target subscription management entity, the request message comprising identity information of the target subscription management entity;
the profile handing entity of the terminal device obtaining reference identity information;
in response to obtaining the request message for the download of a new subscription, the profile handing entity of the terminal device determining whether a release request message should be transmitted to the target subscription management entity, wherein determining that the release request message should be transmitted to the target subscription management entity comprises determining that the identity information of the target subscription management entity comprised in the request message does not match the obtained reference identity information;
after the profile handing entity of the terminal device determines that the release request message should be transmitted, the terminal device transmitting the release request message to the target subscription management entity;
the terminal device receiving from the target subscription management entity a release response message that originated from the source subscription management entity;
the profile handing entity of the terminal device verifying the release response message; and
the profile handing entity of the terminal device allowing the downloading of the new network subscription to the terminal device upon successful verification of the release response message.

2. The method of claim 1, wherein the reference identity information is a certificate that comprises an identification of the source subscription management entity.

3. The method of claim 1, wherein the terminal device comprises an embedded integrated circuit card and the profile handling entity is stored on the embedded integrated circuit card.

4. The method of claim 1, wherein the release request message comprises an identification of the target subscription management entity and at least part of the release request message is signed by the profile handling entity.

5. The method of claim 4, wherein the release response message comprises a replay protected sequence signed by the source subscription management entity.

6. The method of claim 2, wherein verification of the release response message comprises comparing the release response message to the identity information of the source subscription management entity.

7. The method of claim 1, wherein the reference identity information is stored by the profile handling entity.

8. The method of claim 1, further comprising, upon successful verification of the release response message:
replacing the source subscription management entity with the target subscription management entity as subscription management entity for the terminal device.

9. The method of claim 8, wherein the source subscription management entity is replaced with the target subscription management entity only after verification received from a user interface.

10. The method of claim 1, further comprising, upon unsuccessful verification of the release response message:
   transmitting a message at least to the target subscription management entity that the target subscription management entity was not allowed to download a new network subscription to the terminal device.

11. A method for handling network subscriptions of a terminal device comprising a profile handling entity, wherein a network subscription of the terminal device is locked to a source subscription management entity, the method comprising:
   the source subscription management entity receiving from a target subscription management entity a release request message that originated from the profile handling entity of the terminal device as a result of a request for a download to the terminal device of a new network subscription handled by the target subscription management entity;
   in response to receiving the release request message, the source subscription management entity determining whether the target subscription management entity is authorized to provide the new network subscription to the terminal device; and
   after determining that the target subscription management entity is authorized to provide the new network subscription to the terminal device, the source subscription management entity transmitting a release response message to the target subscription management entity, which is configured to forward the release response message to the terminal device, thereby enabling the profile handling entity of the terminal device to download a new network subscription from the target subscription management entity to the terminal device upon successful verification of the release response message.

12. The method of claim 11, wherein at least part of the release request message is signed by the profile handling entity and the target subscription management entity.

13. The method of claim 12, wherein the release request message comprises a replay protected sequence, the method further comprising:
   verifying the release request message by verifying signatures of the profile handling entity and the target subscription management entity in the release request message and by verifying said replay protected sequence.

14. The method of claim 12, wherein at least part of the release response message is signed by the source subscription management entity.

15. The method of claim 11, further comprising:
   receiving a message from the profile handling entity that the target subscription management entity was not allowed to download a new network subscription to the terminal device; and
   operating as the network subscription is still locked to the source subscription management entity in response thereto.

16. A method for handling network subscriptions of a terminal device comprising a profile handling entity, wherein a network subscription for the terminal device is locked to a source subscription management entity the method comprising:
   a target subscription management entity receiving, from the profile handling entity of the terminal device, a release request message of the network subscription;
   the target subscription management entity forwarding the release request message to the source subscription management entity;
   target subscription management entity receiving a release response message of the network subscription from the source subscription management entity; and
   target subscription management entity forwarding the release response message to the profile handling entity, thereby enabling the profile handling entity to download a new network subscription from the target subscription management entity to the terminal device upon successful verification of the release response message.

17. The method of claim 16, wherein the release request message forwarded by the target subscription management entity comprises a replay protected sequence signed by the target subscription management entity, and wherein the release response message received from the source subscription management entity comprises said replay protected sequence also signed by the source subscription management entity.

18. The method of claim 16, further comprising:
   receiving a message from the profile handling entity that the target subscription management entity was not allowed to download a new network subscription to the terminal device; and
   operating as the network subscription is still locked to the source subscription management entity in response thereto.

19. A terminal device comprising a profile handling entity for handling network subscriptions of the terminal device, the profile handling entity comprising:
   processing circuitry; and
   a computer program product storing instructions that, when executed by the processing circuitry, causes the profile handling entity to:
   obtain identity information for a source subscription management entity;
   in response to obtaining a request message for a download of a new network subscription handled by a target subscription management entity, determine whether a release request message should be transmitted to the target subscription management entity, wherein determining that the release request message should be transmitted to the target subscription management entity comprises determining that identity information of the target subscription management entity comprised in the request message does not match the identity information for the source subscription management entity;
   after determining that the release request message should be transmitted, cause the terminal device to transmit the release request message to the target subscription management entity;
   process a release response message transmitted by the target subscription management entity to the terminal device, wherein the release response message originated from the source subscription management entity;
   verify the release response message; and
   allow the downloading of the new network subscription to the terminal device upon successful verification of the release response message.

20. A source subscription management entity for handling network subscriptions of a terminal device comprising a profile handling entity and having a network subscription locked to the source subscription management entity, the source subscription management entity comprising:

processing circuitry; and a computer program product storing instructions that, when executed by the processing circuitry, causes the source subscription management entity to obtain a release request message transmitted by a target subscription management entity, wherein the release request message originated from the profile handling entity of the terminal device as a result of a request for a download to the terminal device of a new network subscription handled by the target subscription management entity;

determine whether the target subscription management entity is authorized to provide the new network subscription to the terminal device; and after determining that the target subscription management entity is authorized to provide the new network subscription to the terminal device, transmit a release response message to the target subscription management entity, which is configured to forward the release response message to the terminal device, thereby enabling the profile handling entity of the terminal device to download a new network subscription from the target subscription management entity to the terminal device upon successful verification of the release response message.

21. A target subscription management entity for handling network subscriptions of a terminal device having a network subscription locked to a source subscription management entity, the target subscription management entity comprising:

processing circuitry; and a computer program product storing instructions that, when executed by the processing circuitry, causes the target subscription management entity to:

receive, from a profile handling entity, a release request message of the network subscription;

forward the release request message to the source subscription management entity;

receive a release response message of the network subscription from the source subscription management entity; and forward the release response message to the profile handling entity, thereby enabling the profile handling entity to download a new network subscription from the target subscription management entity to the terminal device upon successful verification of the release response message.

\* \* \* \* \*